(12) United States Patent
Vashist

(10) Patent No.: US 8,589,334 B2
(45) Date of Patent: Nov. 19, 2013

(54) ROBUST INFORMATION FUSION METHODS FOR DECISION MAKING FOR MULTISOURCE DATA

(75) Inventor: Akshay Vashist, Plainsboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 341 days.

(21) Appl. No.: 13/008,114

(22) Filed: Jan. 18, 2011

(65) Prior Publication Data

US 2012/0023062 A1 Jan. 26, 2012

Related U.S. Application Data

(60) Provisional application No. 61/295,205, filed on Jan. 15, 2010.

(51) Int. Cl.
| | | |
|---|---|---|
| *G06F 17/00* | (2006.01) | |
| *G06N 7/00* | (2006.01) | |
| *G06N 7/08* | (2006.01) | |
| *G10L 21/00* | (2013.01) | |
| *G10L 15/26* | (2006.01) | |
| *G10L 17/00* | (2013.01) | |
| *G10L 15/28* | (2013.01) | |
| *G10L 15/14* | (2006.01) | |
| *G10L 15/00* | (2013.01) | |
| *G10L 15/18* | (2013.01) | |

(52) U.S. Cl.
USPC ............. 706/59; 704/202; 704/208; 704/214; 704/235; 704/246; 704/255; 704/256; 704/257

(58) Field of Classification Search
USPC ............ 706/59; 704/202, 208, 214, 235, 246, 704/255–257
See application file for complete search history.

(56) References Cited

PUBLICATIONS

Aleksic, Petar S., and Aggelos K. Katsaggelos. "Audio-visual biometrics." Proceedings of the IEEE 94.11 (2006): 2025-2044.*
Hall, David L., and James Llinas. "An introduction to multisensor data fusion." Proceedings of the IEEE 85.1 (1997): 6-23.*
Xu, Rongwu, and Lin He. "GACEM: Genetic Algorithm Based Classifier Ensemble in a Multi-sensor System." Sensors 8.10 (2008): 6203-6224.*
Bordes, A., et al., "Fast kernel classifiers with online and active learning", Journal of Machine Learning Research, 6, 2005, pp. 1579-1619.

(Continued)

*Primary Examiner* — Lut Wong
*Assistant Examiner* — James F Sugent
(74) *Attorney, Agent, or Firm* — Philip J. Feig

(57) ABSTRACT

Methods and systems are provided for developing decision information relating to a single system based on data received from a plurality of sensors. The method includes receiving first data from a first sensor that defines first information of a first type that is related to a system, receiving second data from a second sensor that defines second information of a second type that is related to said system, wherein the first type is different from the second type, generating a first decision model, a second decision model, and a third decision model, determining whether data is available from only the first sensor, only the second sensor, or both the first and second sensors, and selecting based on the determination of availability an additional model to apply the available data, wherein the additional model is selected from a plurality of additional decision models including the third decision model.

8 Claims, 3 Drawing Sheets

(56) References Cited

PUBLICATIONS

Camps, G., et al., "Kernel-based framework for multitemporal and multisource remote sensing data classification and change detection", IEEE Trans Geoscience and Remote Sensing, vol. 46, No. 6, Jun. 2008, pp. 1822-1835.

Luo, Z., et al., "Multiple sources data fusion strategies based on multi-class support vector machine", Proceedings of the 5th international symposium on Neural Networks, Springer-Verlag, Berlin, Heidelberg, 2008, pp. 715-722.

Platt, J.C., "Probabilistic outputs for support vector machines and comparisons to regularized likelihood methods", Advances in Large Margin Classifiers, MIT Press, 1999, pp. 61-74.

Richards, J.A., et al., "Remote Sensing Digital Image Analysis: An Introduction", Springer, 4th Edition, 2006.

Tsochantaridis, I., et al., "Support vector machine learning for interdependent and structured output spaces", ICML '04: Proceedings of the twenty-first international conference on machine learning, ACM, New York, NY, vol. 104, 2004.

Vapnik, V., et al., "Learning using hidden information: Master class learning", Mining Massive Data Sets for Security, F. Fogelman-Soulie, D. Perrotta, J. Piskorski, and R. Steinberger eds., IOS Press, 2008, pp. 3-14.

Sheng, Z., et al., "Multisource image fusion method using support value transform", IEEE Transactions on Image Processing, vol. 16, No. 7, 2007, pp. 1831-1839.

* cited by examiner

ROBUST INFORMATION FUSION METHODS FOR DECISION MAKING FOR MULTISOURCE DATA

RELATED APPLICATIONS

This application claims the benefit of priority to U.S. Provisional Application No. 61/295,205, filed on Jan. 15, 2010, titled "Robust Information Fusion Methods for Decision Making from Multisource Data," the contents of which are hereby incorporated by reference in their entirety.

BACKGROUND

1. Technical Field

The present invention relates to the fusion of information from multiple sources for use in decision making.

2. Description of the Related Art

Complex decision making and prediction problems have to deal with and analyze multiple sources of data. Such problems have become more prevalent due to increase both in number and type of sensors. For instance, in a surveillance and threat scenarios, the environment may be monitored by multiple cameras covering different views of the same environment, sound sensors, motion sensors, and possible other sensors (such as RFID). One expects to improve performance of decision making, detection and prediction tasks by using observations from these multiple sources of information (about the same system), although technically it is difficult. Such problems occur in many different fields (such as vegetation monitoring where diverse sources of information include remote satellite sensed images from different sensors and resolutions, ground images used for verification; in bioinformatics detection of a disease can be based on information from proteins sequences, DNA sequences, results biomedical tests, symptoms described by the patient, etc.). This inventions relates to methods for robust decision making from multiple sources of data when data from one or more sources is missing. The proposed methods exploit the correlations between data sources when the information was available when the decision making models where constructed.

In principle, an analysis based on a multiplicity of data sources is appealing. Combining data from multiple sources leads to better decision making by amplifying the database and building support for true indicators that may be weak or not evident in parts of the data. Data combinations can, for example, suppress noise in data and thereby reduce false alarms. However, such real cases are rarely simplistic. In reality, ambiguity often dominates corroborations, multi-source data is incomparable, and conflicting indicators observed in multiple sources make it hard to arrive at a consensus decision. Without the aid of reliable methods that can deal with complex heterogeneous data, the advantages of multisource data do not translate to better decisions. So, in order to leverage the multisource data, advanced decision-making algorithms are needed.

Most current methods using multisource data focus on integrating data from multiple platforms, each representing individual sources. This is a definite and important first step in making sense of diverse data. Its scope appears to be limited to rendering data to a unified structure and format for enabling analysts to access the data and convert it to information for making decisions.

This can work well for simple cases where data from various sources is supplementary in nature and differs mostly in format or is not linked. It does not address most real cases where data from multiple sources is complementary in nature and differs in both type and format, such as data collected from video, image, speech, satellite surveillance, and other sensors. However, the end goal of multisource data analysis is to convert data to information in a form that facilitates decision making. Furthermore, it is often difficult for experts to sort through and analyze such a diversity and volume of multisource data from multiple sensors. Thus, making use of such data requires advanced decision-making methods that can deal with the various dimensions of complexity involved with multisource data.

A comprehensive understanding and inference about complex systems, whether natural or artificial, can, however, be made through observations by multiple types of sensors. Each such sensor brings out a different perspective of the underlying complex system. Due to the diverse nature of observations (such as monitoring a system by images in multiple spectra, parameter values, operational conditions, etc.), data from such sensors is often diverse and uncomparable. As a consequence, data from each sensor needs to be analyzed in its own right.

On the other hand, since the overall data relates to a single system, a sensitive, accurate, and robust analysis must consider each data source (sensor) in the context of data generated by other sources. To illustrate the point, again consider the example of recognizing a terrorist threat. Such an endeavor requires an analysis of communication data (telephone records, email exchanges, etc.), financial transactions, travel information, and social and background information about involved individuals and groups; each data source is very diverse and uncomparable. As another example, land-cover mapping might involve analyzing data obtained from radar, known relief features, satellite imagery at various spectra, etc. Such examples arise in almost all fields and have a common feature in that, although the signal in any single source of data may be weak and noisy, one can build more reliable decisions by simultaneously considering data from multiple sources to allow data from one source to be analyzed in the context of data from other sources.

All currently known multisource information fusion methods use methods developed for single-source data and can be divided into two types based on the stage at which they combine information from different data sources.

The first category, information fusion (shown schematically in FIG. 1), is actually just data aggregation/concatenation, and it involves applying single-source data analysis methods to the combined/stacked data from multiple sources. In doing so, however, one combines uncomparable data and looses the semantics of individual data sources. A more serious disadvantage is the inability to learn accurate models due to the curse of dimensionality, which is magnified as a result of concatenating data from multiple sources. This limits the ability to create decision models that will generalize well to unseen data encountered when the system is deployed.

The second category of methods, shown schematically in FIG. 2, can be called decision fusion methods, which involve applying single-source data analysis methods individually to each of the multiple data sources followed by a fusion of results from each of the sources. This second category of methods completely ignores information from other data sources while analyzing data from any one source and, thus, it fails to take advantage of multiple data sources.

These two approaches to multisource information fusion are thus technically deficient as they are unable to create accurate decision models. And none of these methods are capable of handling a situation when only partial data information is available, i.e., data from all the sources of information (e.g., sensors) is not present for making the decision.

SUMMARY

In the present invention, it has been discovered that, while analyzing data from an individual data source, it is useful to construct a model of noise for this data source using information from a different data source. This helps compensate for deficiencies in any single source of data by utilizing information from other sources. This makes decisions for individual sources more robust to noise and also allows the best use of data sources when they might be missing during the decision-making process.

Thus, the present invention may take the form of a method, system, and a non-transitory computer-readable storage medium for developing decision information relating to a single system based on data received from a plurality of sensors detecting the environment of that system. The method includes receiving first data from a first sensor that defines first information of a first type that is related to a system; receiving second data from a second sensor that defines second information of a second type that is related to said system, wherein the first type is different from the second type; refining the decisions or predictions based on first information by using the second data as auxiliary data and refining the decisions or predictions based second information by using the first data as auxiliary data; generating, by using a processor of the computer, a first decision model for the first sensor based on the refined first information, the first decision model including first scores; generating, by using the processor of the computer, a second decision model for the second sensor based on the refined second information, the second decision model including second scores; generating, by using the processor, a third decision model based on the first and second scores; determining, by using the processor, whether data is available from only the first sensor, only the second sensor, or both the first and second sensors; and selecting based on the determination of availability an additional model to apply the available data, wherein the additional model is selected from a plurality of additional decision models including the third decision model.

The use of multisource data is appealing for making sensitive decisions because poor quality information in any single source can be compensated by information from other sources. In practice, however, an analysis of multisource data is confounded by noisy, incomplete, and partially available data. Here, multisource information fusion architecture and methods are disclosed that respect the semantics of individual data sources through a sensitive analysis of individual data sources, but the analysis of individual data sources is carried out in the context of information from the rest of the sources of data. This method can be applied to a variety of machine learning methods. This method addresses the confounding issues of noisy and missing data. This method is particularly advantageous when multisource data may be available only partially, i.e., when data from some of the sources may be completely missing.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other electronic devices or systems.

Reference will now be made in detail to exemplary embodiments of the present invention, examples of which are illustrated in the accompanying drawings. Whenever possible, the same reference numbers will be used throughout the drawings to refer to the same or like parts.

Figure 1:
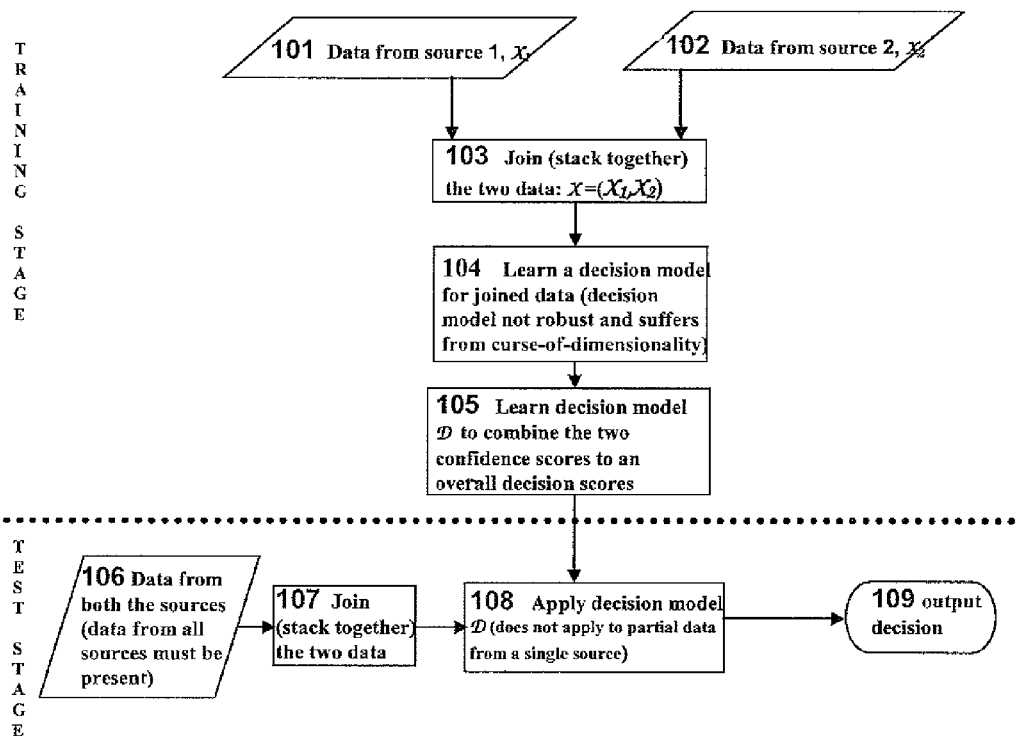
FIG. 1 provides a schematic view of a prior art data aggregation/concatenation approach to multisource information fusion.

As is shown in FIG. 1, steps 101 and 102 indicate data gathered from sources 1 and 2, respectively. In step 103 the data from sources 101 and 102 are stacked together. In step 104 a decision mode is learned for joined data, but it must be understood that any such mode suffers from the curse-of-dimensionality, since there is no readily available model that robustly joins data from two different sources.

In step 105, the learned decision mode is applied, as best it can be, to the stacked data from the first and second sources and converted to confidence scores that are combined to provided overall decision scores.

The decision model from step 105 is then deployed in an active mode with new data from multiple sources, as opposed to the training mode described above. Active mode data is obtained from the first and second sources in step 106 and stacked in step 107. In step 108, the decision model from step 105 is applied to the stacked data to produce an output decision in step 109 But this decision is not robust when there is partial data from either source.

Figure 2:
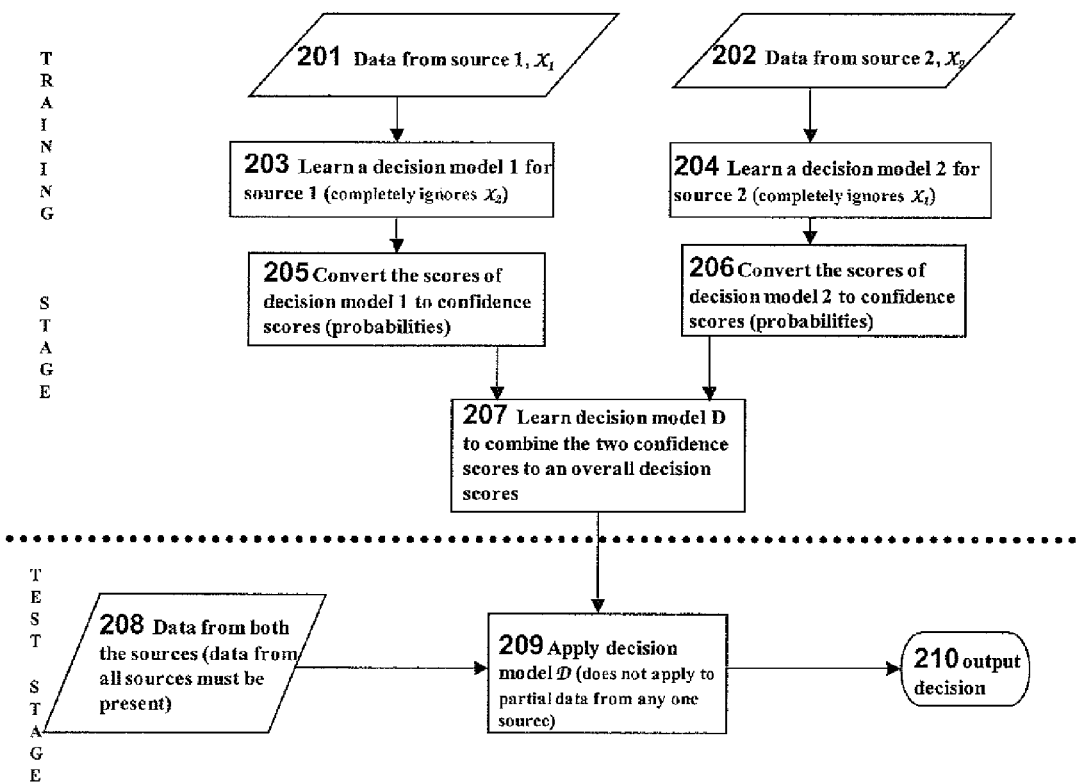
FIG. 2 provides a schematic view of a prior art decision fusion approach to multisource information fusion.

As is shown in FIG. 2, steps 201 and 202 indicate data gathered from sources 1 and 2, respectively. In step 203 a learned decision model 1 is developed for the data from source 201 and in step 204 a learned decision model 2 is developed for the data from source 202. In step 205 the scores from decision model 1 are converted to confidence scores and in step 206 the scores from decision model 2 are converted to confidence scores.

In step 207 a decision model is developed to combine the two confidence scores to overall decision scores. The decision model from step 207 is then deployed in an active mode with new data from multiple sources, as opposed to the training mode described above. Active mode data is obtained from the first and second sources in step 208. In step 209, the decision model from step 207 is applied to the data from both sources to produce an output decision in step 210. But this decision is again not robust when there is partial data from either source.

Figure 3:
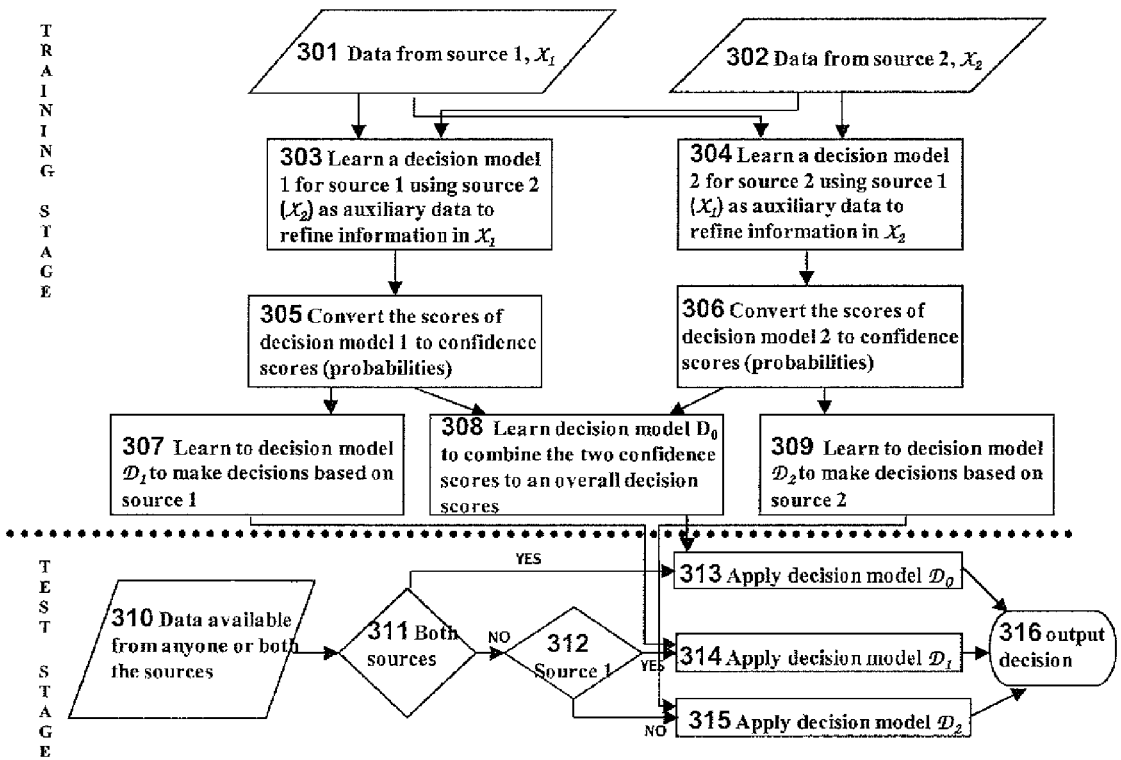
FIG. 3 provides a schematic view of one illustrative approach for multisource information fusion according to the present invention.

Now turning to an illustrative embodiment of the invention, as is shown in FIG. 3, steps 301 and 302 indicate data gathered from sources 1 and 2, respectively. Although two sources are shown, the method of the present invention is applicable to any plurality of sources. For illustrative purposes, FIG. 3 and the related description focus on a case with two sources of information.

In step 303, a learned decision model is developed for the first source using information input from step 301 from the first source as primary data and information input from step 302 from the second source as auxiliary data to build a first robust decision model. Likewise, in step 304, a learned decision model is developed for the second source using information input from step 302 from the second source as primary data and information input from step 301 from the first source as auxiliary data to build a second robust decision model.

The decision values obtained by processing in steps 303 and 304 are then converted to confidence scores or probability scores in steps 305 and 306, respectively. While the decision values are not comparable across data sources, and therefore cannot be combined to derive an overall final decision, the probability scores can be compared and combined to produce an overall decision. In steps 307, 308, and 309, three different models for making decisions in three cases are developed, respectively: when data from only the first source is available, when data from both sources is available, and when data from only the second source is available.

The invention may then be deployed in an active mode with new data from multiple sources, as opposed to the training mode described above. Given the disclosed illustrative example of the invention, when the active mode data from either or both of two different sources (which may, for example, be different forms of sensors) is obtained in step 310, it is determined in steps 311 and 312 if the data is available from both sources or from a single source.

Depending on the availability of data, the relevant decision model obtained from the training mode steps 301-309 is applied. If, at the active mode, data is available from both sources, the decision model for both sources is applied in step 313. If data is available from only the first source, the decision model for the first source is applied in step 314. Otherwise, the decision model for the second source is applied in step 315. The final decision is output in step 316.

Unlike known prior art methods, which simply assume that data from all sources is available, the present invention considers a situation where, at the active mode stage, data from a complete set of sources is not available. Furthermore, when known prior art methods build decision models for individual sources, they completely ignore the information from other remaining data sources. The present invention employs data from remaining sources to build a robust decision model for a particular source. This allows experts to build more sensitive and robust models for each data source, which may later be used in isolation or combination to produce robust decisions in any scenario of data availability, as long as data from at least one source is present.

A more detailed discussion of a preferred embodiment of the invention now follows that may be applied to security, data analysis, pharmaceutical companies, telecommunication companies, or any company/organization dealing with intelligence gathered from data from multiple sources.

Most current methods known to the inventor dealing with multisource data focus on integrating data, where the goal is to render data gathered from multiple platforms to a common format. This first step towards multisource data analysis is clearly useful and there are specific guidelines on how this is accomplished on different levels. Many architectures have been proposed to facilitate such an integration of data, and most of these are inspired by database concepts and primarily deal with presenting a unified and structured view of data obtained from different platforms. There are also tools which help visualize and link data from these platforms to help experts discover hidden connections to uncover intended activities.

Whereas the goal of multisource data analysis is to accumulate information for decision making, current methods merely perform data integration to facilitate further data analysis and decision making. However, when multiple sources are truly diverse, such as video, images, speech, textual and contextual information, etc., data integration methods do not provide a satisfactory solution to convert data to information helpful for decision making.

In particular, for effective multisource data utilization and threat analysis/detection, an automatic method is required with the capability to fuse information from diverse sources. Some research dealing with information fusion exists, and such research can be divided into three classes based on the level at which information is combined together.

In the first and simplest class of methods, data (vectors) from different sources are stacked together (vector stacking). This step data is treated as if it originated from a single source, and methods appropriate for single-source data analysis are employed. Clearly, such insensitivity to diverse types of data ignores their semantic meaning and results in poor performance. Also, stacking data from different sources increases the dimensionality of the problem, thus augmenting the curse of dimensionality.

In the second class of methods, one defines a separate metric for each type of data, followed by some scheme to combine these metrics to design a single metric (such as a weighted sum of distances from different sources). Once a single metric is obtained, traditional methods for single-source data are employed. The methods are suboptimal since there is no basis for combining metrics/distances from various data sources. Furthermore, when data from a subset of sources is incomplete or missing, errors get propagated to overall analysis (recall that different sources of data are complementary and are best used for compensating deficiencies in data sources rather than propagating errors).

There is a third class of methods, where single-source data analysis methods are employed for each data source in which decisions based on individual sources are combined to obtain an overall decision. In essence, this amounts to collecting support for a decision from individual sources and combining them to derive the overall decision. The difficulty of this approach arises during combining individual decisions, where the scales may be incomparable. Furthermore, individual decisions themselves would be more reliable if cross-data information could be leveraged to influence them. This especially holds true for poor quality, noisy, and incomplete data.

There is no known general and principled methodological framework for combining different sources of information that involve different sensors, time instants, and spatial or contextual extracted features. Furthermore, current known methods are not efficient, do not have tunable complexity, and do not deal with data deficiencies, such as noise, missing attributes, data missing entirely from a subset of sources over a period of time, and in general with causes of poor quality. The present invention provides principled solutions to address these issues.

The issues that arise in decision making and analysis of multisource data are considered next, including those specific to multisource data, such as when, for instance, the two sources may be video frames from a surveillance camera and data from biometric sensors. Various inferences or decision-making problems in adversary modeling and detection can be cast as classification (predicting categories), regression (predicting a real value), or outlier detection (anomaly detection and modeling). The concepts behind the problems described can be easily extended to ranking (predicting preferences for a given set of cases) and for making structured predictions (such as modeling, learning, and predicting relationships between entities).

All notations that follow are standard. Boldface and lowercase symbols represent vectors, while boldface and uppercase symbols represent matrices. Whenever two boldface lowercase symbols appear together, it represents their dot (inner product.

Two illustrious sources of data may be characterized as l observations $\{x_i\}_{i=1}^{l}$ and $\{x_i^*\}_{i=1}^{l}$ from the first and the second source, respectively. For instance, $x_i$ and $x_i^*$ may represent data captured by a video sensor and an audio sensor, respectively, at time i. Each data point is represented by a vector, i.e., $x_i=(x_{i1}, \ldots, x_{in}) \in R^n$ is an n dimensional vector, and $x_i=(x_{i1}^*, \ldots, x_{im}^*) \in R^m$ is an m dimensional vector. Additionally, a value $y_i$ may be associated with each observation (vectors) $x_i$ and $x_i^*$; in such cases, assume that there exists a (unknown) function that relates x or x* or both to the value.

Consider the following decision problems in the context of multisource data. Problems P1, P2, and P3 are standard adaptations of corresponding problems for single-source data, while problems P1a, P2a, and P3a are new formulations which arise specifically in the context of multisource data and have not been considered before.

We begin with the unsupervised learning setting and its variation for multisource data.

P1 (Anomaly Detection)

Given: l pairs of observations $\{x_i, x_i^*\}_{i=1}^{l}$,

Find: the "outlier" observations in the given and continue to detect outliers in subsequent observations $\{x_i, x_i^*\}_{i=l+1}^{\infty}$.

This is an unsupervised learning problem since an explicit definition of an outlier is not given. The goal is to discover unrepresentative observations that informally correspond to suspicious observations. In the context of threat detection, these might correspond to threats or observations deserving further investigation.

An important issue in this problem is noisy data, since noise in observed values can make otherwise normal observations appear as outliers. So it is desirable to have algorithms that can be tuned to the level of noise in data. For multisource data, it is critical to consider the similarity/distance between observations in the two spaces (two sources) separately, since observations from different sources may be incomparable. The invention provides a new solution to this problem.

An important scenario for multisource data arises when there is only partial data (data only from one of the sources) for future decisions. Consider the following problem.

P1a (Future Anomaly Detection from Partial Information)

Given: l pairs of observations $\{x_i, x_i^*\}_{i=1}^{l}$,

Find: the "outlier" observations in the given. Continue to detect outliers in subsequent observations; however, given observations from one of the sources only, e.g., $\{x_i\}_{i=l+1}^{\infty}$, Supervised learning problems and their variations specific to multisource data will now be considered.

P2 (Binary Classification)

Given: l triplets $\{x_i, x_i^*, y_i\}_{i=1}^{l}$, where label $\{y_i\}_{i=1}^{l}$, $y_i \in \{\pm 1\}$ specifies one of the classes to which the observation i belongs, Find: $\{y_i\}_{i=l+1}^{\infty}$ for pairs $\{x_i, x_i^*\}_{i=l+1}^{\infty}$, This is the binary classification problem. In general, $y_i$ can be any of c classes, but the binary-classification problem is considered here for simplicity. There are many methods to extend binary classification to multiclass classification.

As in the unsupervised case, it is important to consider a situation where one has to predict the class of future observations from single-source data.

P2a (Binary Classification with Partial Information)

Given: l triplets $\{x_i, x_i^*, y_i\}_{i=1}^{l}$, where label $\{y_i\}_{i=1}^{l}$, $y_i \in \{\pm 1\}$ specifies one of the classes to which the observation i belongs, Find: $\{y_i\}_{i=l+1}^{\infty}$ for single-source data, e.g., $\{x_i\}_{i=l+1}^{\infty}$.

Consider also regression problem (function estimation) analogs of the classification problems as follows.

P3 (Regression)

Given: l triplets $\{x_i, x_i^*, y_i\}_{i=1}^{l}$, where label $\{y_i\}_{i=1}^{l}$, $y_i \in I$, Find: $\{y_i\}_{i=l+1}^{\infty}$ for pairs $\{x_i, x_i^*\}_{i=l+1}^{\infty}$, P3a (Regression with Partial Information)

Given: l triplets $\{x_i, x_i^*, y_i\}_{i=1}^{l}$, where label $\{y_i\}_{i=1}^{l}$, $y_i \in I$, Find: $\{y_i\}_{i=l+1}^{\infty}$ for single-source data, e.g., $\{x_i\}_{i=l+1}^{\infty}$.

An important issue in all of the above problems is dealing with noisy data. Noise in observed values can make otherwise normal observations appear as outliers (P1 and P1a). It can also be misleading to supervised learning algorithms as it may hinder constructing appropriate models of data. So it is desirable to have algorithms that can be tuned to the level of noise in data. Another crucial issue is related to the comparability of data from multiple sources. It is critical to consider the similarity between observations in the two spaces (two sources) separately.

The idea of Support Vector Machine (SVM) algorithms, which are found in statistical learning theory, may be extended to develop algorithms for multisource data. Originally, SVM was a binary classification algorithm that has now been adapted to very diverse data analysis problems.

a. Background of SVM

SVM considers input data $\{x_i, y_i\}_{i=1}^{l}$ as two classes (classes are defined as $y_i$) of vectors in an n-dimensional space. It constructs a separating hyperplane in that space, in particular, it finds the hyperplane that separates the data (points from the two classes lie on opposite sides of the hyperplane) and maximizes the margin between the two data sets. The margin is calculated as the distance between two parallel hyperplanes, one on each side of the separating hyperplane, which support the data on each respective side. Statistical learning theory dictates that a large margin is an indicator of low generalization error on unseen data. When no separating hyperplane exists in input space, SVM maps the given data into a higher dimensional space, where data becomes linearly separable; this idea is realized through the so-called kernel trick. Of course, any data can become linearly separable when mapped to sufficiently high (or infinite) dimensional space, and this can potentially lead to overfitting of the given data. However, SVM controls this curse of dimensionality by finding a large-margin hyperplane in the mapped space.

Essentially, the basic idea of SVM is to find an optimal separating hyperplane that makes a small number of training errors and possesses a large margin. Two other concepts are the ability to find nonlinear decision boundaries using the so called kernel-trick and generalization to cases where no separable hyperplane can be found.

Formally, to learn the decision rule y=f(x) given training data $\{x_i, y_i\}_{i=1}^{l}$, SVM first maps vectors x of space X into vectors z of space Z, where it constructs the optimal separating hyperplane. (In the space X, this hyperplane corresponds to some nonlinear function.) In other words, consider the following problem: minimize the functional $$R(w, b, \xi) = \frac{1}{2}w^2 + C\sum_{i=1}^{l}\xi_i \qquad (1)$$

subject to constraints $$y_i[wz_i+b] \geq 1-\xi_i, \xi_i \geq 0, i=1,\ldots,l, \qquad (2)$$

where (w, b) represents the hyperplane in space Z, $\xi_i'$ corresponds to margin errors, and C is the penalty for violating the margin constraint. When the problem is separable, all $\xi_i$ are 0 and the second term in the objective function vanishes. For nonseparable problems, however, either some observations violate the margin constraint or are classification errors; the penalty for such violations are controlled by a user-specified parameter C. By adjusting the value of the parameter C, one can tune to the level of noise in the data.

The standard technique for solving this quadratic optimization problem is to solve the dual of the above optimization problem and invoke the kernel trick. The (dual space) solution of this problem requires maximizing the functional $$R(\alpha) = \sum_{i=1}^{l}\alpha_i - \frac{1}{2}\sum_{i,j=1}^{l}\alpha_i\alpha_j y_i y_j K(x_i, x_j) \qquad (3)$$

subject to constraints $$\sum_{i=1}^{l} y_i\alpha_i = 0, \qquad (4)$$

$$0 \leq \alpha_i \leq C, i=1,\ldots,l, \qquad (5)$$

where coefficients $\alpha$ are to be determined, coefficient $\alpha_i$ corresponds to the $i^{th}$ training example, and $K(x_i; x_j)$ is the value of the kernel function and corresponds to the similarity value between $x_i$ and $x_j$ in the space Z. Suitable kernel function has to be positive definite and, by employing universal kernels, SVM can approximate any decision function.

The decision function is given by $$f(x) = \text{sgn}[wz+b] = \text{sgn}\left[\sum_{i=1}^{l} y_i\alpha_i K(x_i, x) + b\right], \qquad (6)$$

where coefficients $\alpha$ and b are obtained by maximizing the functional (3) subject to constraints (4) and (5).

b. SVM Regression

The underlying principles for the binary classification SVM can be easily extended to solve the regression problem. In the regression problem, the goal is to predict real values instead of binary class values, given a vector description of data (this corresponds to the single-source data version of problem P2 in Section II). Accordingly, the goal is to estimate a real-valued regression function $y=f(x)$. To achieve this, one again maps $x \in X$ to vectors $z \in Z$ and approximates the regression by a linear function in Z space as $$y=wz+b,$$

where w and b have to be determined. The regression SVM (RSVM) differs from the classification SVM mainly in the loss function. In RSVM, minimize the following functional $$R(w, b) = \frac{1}{2}w^2 + C\sum_{i=1}^{l}\left|y_i - wz_i - b\right|_\epsilon,$$

where $u_\epsilon$ is the so-called $\epsilon$-insensitive:

$u_\epsilon = 0$ if $|u| \geq \epsilon$ and $u_\epsilon = u$ if $|u| > \epsilon$.

To minimize this functional, solve the following equivalent problem: minimize the functional $$R(w, b, \xi, \xi^*) = \frac{1}{2}w^2 + C\sum_{i=1}^{l}(\xi_i + \xi_i^*)$$

subject to constraints $$y_i - wz_i) - b \leq \epsilon + \xi_i, i=1,\ldots,l,$$

For computational reasons and for the convenience of implicit mapping to higher dimension space, the dual of the above optimization problem is solved, as in the classification case. Then, the regression function is given by $$y = \sum_{i=1}^{l}(\alpha_i^* - \alpha_i)K(x_i, x) + b,$$

where the coefficients $\alpha$, $\alpha^*$ are obtained by solving the dual optimization problem and $K(\cdot, \cdot)$ is a positive definite kernel (that defines inner product of Z space in X space). The algorithm for solving this quadratic optimization problem is similar to the one for solving the optimization for the SVM classification case.

c. SVM for Outlier Detection

Now consider the single-source data version of the unsupervised learning problem P1 stated in Section II. To be precise, given data $\{x_i\}_{i=1}^{l}$, the goal is to find outliers in this data and construct their model for outlier detection in subsequent data.

Use the one-class SVM formulation where one tries to enclose the given data inside a small hypersphere. The points that do not lie inside the hypersphere are penalized and considered to be outliers. As in the classification and regression SVM, the data $x \in X$ is first mapped to $z \in Z$, with the hypersphere of radius R centered at $a \in Z$. The goal is to minimize the radius R and the penalties for the points lying outside the hypersphere. Formally, this can be described as $$\min_{R,\xi,a} R^2 + C\sum_{i=1}^{l}\xi_i \qquad (6)$$

subject to $\|z_i-a\|^2 \leq R^2+\xi_i, \xi_i \geq 0, i=1,\ldots,l,$ where the parameter C decides the penalty for violations and controls the tradeoff between the radius and the number violations. Formally, this also controls the notion of outliers or anomalies.

The techniques to solve the standard classification SVM can be easily adapted to solve this problem as well. Furthermore, the solution also produces the radius R, the center a in the space Z specified by the kernel mapping above. The knowledge of R and a is used for identifying outliers in subsequent data.

IV. Decision Methods for Multisource Data

This section describes how the invention contributes to multisource information fusion and analyzes such data for decision making. A key to the solutions of problems P1, P2, and P3 lies in carefully adapting the SVM-based methods and making them suitable to multisource data. As stated earlier, problems P1a, P2a, and P3a have not been considered earlier as is done therein, although it is, in part, inspired by recent work that uses some additional information at the training stage in classification algorithms.

From the perspective of multisource data, problems P1, P2, and P3 are identical in nature in that future data, when decisions have to be made, is assumed to be available from both sources. The essential requirement in these problems is to consider the similarities in the two spaces (corresponding to two sources) separately. The present invention provides two different solutions for these problems. In the first solution, the information fusion approach is employed where the similarities are computed separately, the two similarities (fusion step) are aggregated, and the appropriate problem is solved based on the aggregated similarity. The second solution is limited to the classification case P2. In this approach, the invention uses the decision fusion approach, where separate decisions are based on individual sources of data and then combined (fusion step) to compute the overall decision.

Problems P1a, P2a, and P3a are also identical in nature in that there is access to both sources of data during the learning stage, but the decision for subsequent or future data must be based on a single source of data. One cannot, however, perform decisions on one source as well as decisions based on both sources of data. A goal of the present invention is to use the additional source of data maximally during training. Basic SVM-related algorithms have an explicit representation of noise (the stacks $\xi$'s), albeit in absence of any other information, the noise term may model random noise in data. Using the principles of the present invention, noise in one source of data may be modeled using data from the other source. This will allow construction of more sensitive decision models in individual spaces compared to those using random models of noise.

a. Information Fusion Approach

In this approach, separate metrics are computed for information from two data sources. This is done by mapping first data $x \in X$ to $z \in Z$ and second data $x^* \in X^*$ to $z^* \in Z^*$. To do this, two different kernels are used, one in each of the spaces, to compute similarities: kernels $K(x_i; x_j)$, $K^*(x_i^*, x_j^*)$ are used in first and second spaces, respectively. Then these two kernel values are linearly combined to produce a new kernel, $K_{ij} = K(x_i, x_j) + \mu K^*(x_i^*, x_j^*)$, and used in algorithms for single-source data. Then, the combined kernel value $K_{ij}$ is substituted in the dual of the optimization problems for single-source methods. For instance, $K(x_i, x_j)$ can be replaced by $K_{ij}$ in equation (3) and the solution obtained for the multisource data problem. Similar substitutions are performed in the duals of the regression and the outlier detection cases.

b. Decision Fusion Approach

In this approach, the individual data sources are initially treated separately, and the single-source algorithm described in Section III is used. After obtaining the decision for data from this individual source, the support for decisions as probability of a data point in a given class is computed. Then, these probabilities based on individual data sources may be combined to output the overall decision. Since the conversion of decision values to probabilities can be only for the classification problem, this approach applies directly to problem P2. For the other problems, one can con compute the confidence scores and use them instead of the probability scores.

One criticism for this approach is that the second source of information is totally ignored while making decisions based on the first source, and vice versa. The present invention, however, considers the second source of information to model noise in the first source, and thereby improves decisions for the first based on the first source of information. Thus, there is improved decision making from individual sources and therefore the fusion of such improved decisions improves the overall decision-making process.

c. Decisions Based on a Single Source of Data

As stated earlier, in this scenario, both the sources of data are available during the learning stage, but at the time of analysis, only one of the sources is available. The central idea is to construct a model of noise using the source that is available only during the learning stage. Without loss of generality, the invention contemplates that the information from the second source may not be available for making future decisions.

d. Outlier Detection

First, addressing the problem P1a, the anomaly detection problem is still modeled on finding a small hypersphere that encloses the data. However, the definition of violations now changes; informally, if the violations can be "explained" by the second source of data, they are less severely penalized or not penalized at all, depending on the support present in the second source of data. This is accomplished by mapping vectors $x \in X$ to $z \in Z$ and vectors $x^* \in X^*$ to $z^* \in Z^*$. By the use of the second mapping to model noise (the stacks $\xi_i$) as $$\xi_i = w^* z_i^* + d, \qquad (7)$$

this modifies the formulation of one-class SVM to $$\min_{R,\xi,a} R^2 + \frac{1}{2} w^{*2} + C \sum_{i=1}^{l} (w^* z_i^* + d) \qquad (8)$$

subject to $\|z_i - z\|^2 \leq R^2 + \xi_i, \xi_i \geq 0, i=1, \ldots, l$. (9)

The dual of the above problem is then solved to obtain the value of R and a, which is then used to assess outliers in the future data.

e. Classification Problem

Using the same ideas as in the outlier detection problem above, the classification SVM may be modified to minimize the functional $$R(w, w^*, b, b^*) = \frac{1}{2}[w^2 + \gamma w^{*2}] + C \sum_{i=1}^{l} [(w^* z_i^*) + d]$$

subject to constraints $y_i[wz_i) + b] \geq 1 - [(w^* z_i^*) + d], i=1, \ldots, l,$ $[w^* z_i^*) + d] \geq 0, i=1, \ldots, l.$ The (dual space) solution to this problem is defined by the decision function $$f(x) = wz + b = \sum_{i=1}^{l} y_i \alpha_i K(x_i, x) + b. \qquad (10)$$

Here, $K(x_i, x_j)$ and $K^*(x_i^*, x_j^*)$ are kernels in X and X* spaces that define inner products in Z and Z* spaces, and $\alpha$, $\beta$ are the solution of the following optimization problem: maximize the functional $$R(\alpha\beta) = \sum_{i=1}^{l} \alpha_i - \frac{1}{2}\sum_{i,j=1}^{l} \alpha_i\alpha_j y_i y_j K(x_i, x_j) - \frac{1}{2}\sum_{i,j=1}^{l}(\alpha_i + \beta_i - C)(\alpha_j + \beta_j - C)K^*(x_i^*, x_j^*) \quad (11)$$

subject to three types of constraints $$\sum_{i=1}^{l}(\alpha_i + \beta_i - C) = 0, \quad (12)$$

$$\sum_{i=1}^{l} y_i\alpha_i = 0,$$

$$\alpha_i \geq 0, \beta_i \geq 0.$$

From a computational point of view, the SVM+ algorithm that takes into account two sources of data is very similar to SVM algorithms for finding solutions in the classical pattern recognition framework. It requires solving a quadratic optimization problem under constraints that are similar to constraints in the classical SVM.

f. Regression Problem

As in the classification problem, vector x is first mapped into Z space, vector x* into space Z*, whereafter three sets of linear functions are considered:

(1) a set of linear functions wz+b, which approximates a decision function;

(2) a set of linear functions $w_1^*z^*+b_1^*$, which construct the model of noise for stacks $\xi_i$; and (3) a set of linear functions $w_2^*z^*+b_2^*$, which will construct the model of noise for stacks $\xi_i^*$.

Therefore, the problem can be minimization of the functional $$R(w, w_1^*, w_2^*, b, b_1^*, b_2^*) = \frac{1}{2}[w^2 + \gamma[w^{*2} + w_2^{*2}]] + C\sum_{i=1}^{l}[(w_1^*z_i^*) + b_1^*] + C\sum_{i=1}^{l}[(w_2^*z_i^*) + b_2^*]$$

subject to constraints $$y_i - wz_i) - b \geq \epsilon + (w_i^*z_i^*) + b_1^*, i=1,\ldots,l,$$

$$(wz_i) + b - y_i \geq \epsilon + (w_2^*z_i^*) + b_2^*, i=1,\ldots,l,$$

$$[w_1^*z_i^*] + b_1^* \geq 0, i=1,\ldots,l,$$

$$[w_2^*z_i^*] + b_2^* \geq 0, i=1,\ldots,l.$$

The dual space solution to this problem defines the decision function $$f(x) = \sum_{i=1}^{l}(\alpha_i^* - \alpha_i)K(x_i, x) + b.$$

Here, $K(\bullet,\bullet)$ and $K^*(\bullet,\bullet)$ are kernels that define inner products for spaces Z and Z*, respectively. The parameters $\alpha$, $\alpha^*$, $\beta$, $\beta^*$ are a solution to the following optimization problem: maximize the functional $$R(\alpha, \alpha^*, \beta, \beta^*) =$$

$$-\varepsilon\sum_{i=1}^{l}(\alpha_i + \alpha_i^*) + \sum_{i=1}^{l}y_i(\alpha_i^* - \alpha_i) - \frac{1}{2}\sum_{i,j=1}^{l}(\alpha_i^* - \alpha)(\alpha_j^* - \alpha_j)K(x_i, x_j) - \frac{1}{2\gamma}\sum_{i,j=1}^{l}(\alpha_i^* + \beta_i^* - C)(\alpha_j^* + \beta_j - C)K*(x_i^*, x_j^*) - \frac{1}{2\gamma}\sum_{i,j=1}^{l}(\alpha_i + \beta_i - C)(\alpha_j + \beta_j - C)K*(x_i^*, x_j^*)$$

subject to constraints $$\sum_{i=1}^{l}\alpha_i^* = \sum_{i=1}^{l}\alpha_i,$$

$$\sum_{i=1}^{l}(\alpha_i^* + \beta_i^* - C) = 0,$$

$$\sum_{i=1}^{l}(\alpha_i + \beta_i - C) = 0,$$

$$\alpha_i^* \geq 0, \alpha_i \geq 0, \beta_i^* \geq 0, \beta_i \geq 0, i = 1, \ldots l.$$

From a computational point of view, this algorithm in which the second source of information is used to model noise in the first source, is similar to a classical SVM algorithm for solving the regression estimation problem.

g. Decision Making from Missing Information

As in single-source data, one often encounters missing attributes in multisource data as well. For imputing the missing values, one could use methods suitable for single-source data, such as imputation by average or median value of the attribute, or imputation by attribute value of the nearest point. The present invention contemplates a regression function being learned to impute the missing values; furthermore, this regression may be performed based on multisource information.

The proposed information and decision fusion methods of the present invention are true multisource data analysis methods as they treat the individual sources in their own right and use them to accumulate supporting evidence for decisions that are output. The disclosed method has a strong theoretical foundation in statistical learning and is inspired by state-of-the-art learning methods that have been shown to work well in a wide array of fields. Efficient and scalable solutions exist for the single-source methods that are the basis of the present invention, so scalable and efficient solutions are likewise available. By design, the disclosed invention is a very general method that is applicable to multisource data from very diverse domains. It can be adapted to specifics of any particular data source by devising kernels (similarity metrics) suitable to the data source.

As stated here throughout, tunable knobs (the parameter C) exist which trade off the capacity of a learned function with the level of noise in data. Often, one does not have an a priori estimate of the level of noise in data; this is automatically considered during model selection at the training stage. In model selection, one tunes the free parameters in the learning algorithm using well-known methods of cross-validation, wherein the given input data is randomly divided into training data and validation data, and one selects the value of parameters that yield the best performance on the validation set. This process may also be used to tune the kernel parameters.

The algorithms proposed here are nonlinear and, hence, are capable of estimating a higher order of dependencies in data. This nonlinearity is obtained by choosing appropriate kernels that capture the effect of mapping the data to higher dimensions where data becomes separable by hyperplane. This also alleviates the need of feature generation from input data, since this process is automatically controlled by tuning the kernel parameters. Appropriate kernels for multisource data have been disclosed, as these are general techniques, and suitable kernel functions can be decided if there is a known data type. There is a large amount of research that focuses on developing kernels for various kinds of data.

In the classification problem, there are scenarios where data is skewed, or data from one class far exceeds the data from the other class (an extreme case is when there is only data from a single class; in this case, the problem becomes unsupervised learning, which has already been addressed by using one-class SVM). In such cases, the performance of algorithms that do not address this issue suffers. A simple solution is to use an asymmetric penalty (the parameter C) for the two classes, in other words, violations from the smaller classes are not heavily penalized, and this ensures that a model is chosen that captures the smaller class very well.

The present invention is capable of using multisource data gathered from various monitoring and surveillance tools. The present invention proposes new unsupervised and supervised learning algorithms, both grounded in statistical learning theory, to address problems arising in threat analysis and decision making. These methods for learning from multisource data are adapted from state-of-the-art and emerging learning methods for single-source data. Furthermore, these methods address the confounding issues of noisy, incomplete, and partially available data. These methods are capable of working with large data sets, can be deployed over the Web, and can be used to develop tools to aid in analysis of multisource data in general and threat detection in particular.

The present invention is based on state-of-the-art and emerging machine learning methods grounded in statistical learning theory for decision making from high-dimensional multisource data. Since these basic methods, which form the basis of the present invention, are capable of discovering highly nonlinear relationships within a data type, the present invention is likewise capable of discovering highly nonlinear interactions in information from multiple sources. The present invention is capable of robust decision making even in cases where data (a) is incomplete due to parts of the data missing from some of the sources, (b) is noisy, (c) is skewed (instances of some categories far exceed those of others), and (d) where there may simply be interest in merely seeking anomalies in data.

Consider a surveillance case where a decision whether a situation is a security violation or not is to be made (by a computer) after analyzing a video, sound, and perhaps other hints from a human. Clearly, the decision making process has to be automatic and the human will not be present to assist the computer when the system is deployed but may be present during training the computer system and may supply with annotation (threat, security violation, etc) and perhaps by explaining the suspect features involved in the violation or threat.

What Current Methods do:

Current systems will operate by training the computer system using a collection of annotated (threat/violation or not) video and sound sequences. They will learn a single decision rule that take video and sound as input (typically two separate decision rules learned for video and sound and then combine to produce a single decision) and produce a decision (say in the form of an alarm sound, alerting an operator, etc.) whether the situation is a violation or a normal situation. In real life there are situations when either the video or the sound is unavailable or is simply inapplicable to the situation and when that happens current systems will produce inferior decision rules which will make mistakes or misclassification of situation. This happens because information is available partially (only video or the sound is available) and these systems have ignored any correlation between the two sources when they were trained.

Proposed Exemplary Method:

The method proposed by us considers correlations between multiple sources of information during the training stage. In other words, when the proposed system learns a decision rule for video, our proposed methods allow it to correlate the video with the corresponding sound (which was present at the training stage) and produce a more accurate decision rule (compared to current systems) for making decisions based on the video; and vice versa, for making decisions based on sound, our method allow it to correlate it with corresponding video and thereby learn a more accurate decision rule for sound. Since, decision rules for individual sources are more accurate, we make a more accurate combined decision about the security violation or the threat. This is especially important when either sound or video is not present for a situation. In that case, our individual decision rules are more accurate compared to the rules produced by state-of-the-art systems and will lead to fewer misclassification and mistakes.

Similar Applications in Other Fields:

The example described above is a very general one and the method applies to similar situations across a wide field. For instance, in remote surveillance, we may need to make decisions about vegetation land-cover, detecting threatening installations, etc. based on satellite images, RADAR images, and other remote sensing technologies (instead of video and sound in the above example). In medicine, one can apply the proposed method to detect disease based on analysis of symptoms, various tests, blood protein analysis, and genetic analysis—all of these may not be available or applicable for all patients but these different sources of information (symptoms, tests, blood protein analysis, genetic analysis, etc.) have correlations which can be used by our method to learn accurate decision rules when some of this information is missing or unavailable.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in many other ways, using equivalents and alternatives that do not depart from the scope of the following claims.

The systems and methods disclosed herein may be embodied in various forms, including, for example, a data processor, such as a computer that also includes a database, an input device, and output device. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with the teachings of the invention, or it may be more convenient to construct a specialized apparatus or system to perform the required methods and techniques.

Systems and methods consistent with the present invention also include nontransitory computer-readable storage media that include program instructions or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

It is important to understand that both the foregoing general description and the following detailed description are exemplary and explanatory only, and are not restrictive of the invention as claimed.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A computer-implemented method for developing decision information relating to a single system based on data received from a plurality of sensors detecting the environment of that system comprising the steps of:
   receiving first data from a first sensor that defines first information of a first type that is related to a system;
   receiving second data from a second sensor that defines second information of a second type that is related to said system, wherein the first type is different from the second type;
   refining the first information by using the second data as auxiliary data and refining the second information by using the first data as auxiliary data;
   generating, by using a processor of the computer, a first decision model for the first sensor based on the refined first information, the first decision model including first scores;
   generating, by using the processor of the computer, a second decision model for the second sensor based on the refined second information, the second decision model including second scores;
   generating, by using the processor, a third decision model based on the first and second scores;
   determining, by using the processor, whether data is available from only the first sensor, only the second sensor, or both the first and second sensors;
   selecting based on the determination of availability an additional model to apply the available data, wherein the additional model is selected from a plurality of additional decision models including the third decision model;
   converting the first scores of said first model to confidence scores by applying a probability, wherein generating the third decision model based on the first and second scores includes generating the third decision model based on the confidence scores;
   wherein the third decision model is selected as the additional model for application of data from both said first and second sensors when the determination of availability indicates that data is available from both said first and second sensors;
   generating a fourth decision model based on said confidence scores;
   wherein the fourth decision model is selected as the additional model for application of data from said first sensor when the determination of availability indicates that data is only available from said first sensor;
   generating a fifth decision model based on said confidence scores; and wherein the fifth decision model is selected as the additional model for application of data from said second sensor when the determination of availability indicates that data is only available from said second sensor.

2. The method of claim 1, wherein data is collected from at least two types of video, image, speech, or satellite surveillance sensors.

3. The method of claim 1, wherein said second information has a diverse semantic meaning in a different dimension than the dimension of the first data, which differs in both type and format.

4. The method of claim 1, further comprising:
   converting the second scores of said first model to the confidence scores by applying the probability, wherein generating the third decision model based on the first and second scores includes generating the third decision model based on the confidence scores.

5. The method of claim 1, further comprising:
   detecting an abnormality in the system by applying the available data to the selected additional model.

6. A computer-implemented method for developing decision information relating to a single system based on data received from a plurality of sensors detecting the environment of that system comprising the steps of:
   receiving first data from a first sensor that defines first information of a first type that is related to a system;
   receiving second data from a second sensor that defines second information of a second type that is related to said system, wherein the first type is different from the second type;

refining the first information by using the second data as auxiliary data and refining the second information by using the first data as auxiliary data;

generating, by using a processor of the computer, a first decision model for the first sensor based on the refined first information, the first decision model including first scores;

generating, by using the processor of the computer, a second decision model for the second sensor based on the refined second information, the second decision model including second scores;

generating, by using the processor, a third decision model based on the first and second scores;

determining, by using the processor, whether data is available from only the first sensor, only the second sensor, or both the first and second sensors;

selecting based on the determination of availability an additional model to apply the available data, wherein the additional model is selected from a plurality of additional decision models including the third decision model;

converting the first scores of said first model to first confidence scores by applying a first probability;

converting the second scores of said second model to second confidence scores by applying a second probability, wherein generating the third decision model based on the first and second scores includes generating the third decision model based on the first and second confidence scores;

generating a fourth decision model based on said first confidence scores; and generating a fifth decision model based on said second confidence scores;

wherein the third decision model is selected as the additional model for application of data from both said first and second sensors when the determination of availability indicates that data is available from both said first and second sensors;

wherein the fourth decision model is selected as the additional model for application of data from said first sensor when the determination of availability indicates that data is only available from said first sensor;

wherein the fifth decision model is selected as the additional model for application of data from said second sensor when the determination of availability indicates that data is only available from said second sensor; and selecting based on the determination of availability an additional model to apply the available data, wherein the additional model is selected from a plurality of additional decision models including the third decision model.

7. A system for developing decision information based on data received from a plurality of sensors, the system comprising:

an input device receiving first data from a first sensor that defines first information of a first type that is related to a system and receiving second data from a second sensor that defines second information of a second type that is related to said system, wherein the first type is different from the second type;

a processor:
refining the first information by using the second data as auxiliary data and refining the second information by using the first data as auxiliary data;
generating a first decision model for the first sensor based on the refined first information, the first decision model including first scores;
generating a second decision model for the second sensor based on the refined second information, the second decision model including second scores;
generating a third decision model based on the first and second scores;
determining whether data is available from only the first sensor, only the second sensor, or both the first and second sensors; and
selecting based on the determination of availability an additional model to apply the available data, wherein the additional model is selected from a plurality of additional decision models including the third decision model;
converting the first scores of said first model to confidence scores by applying a probability, wherein generating the third decision model based on the first and second scores includes generating the third decision model based on the confidence scores;
wherein the third decision model is selected as the additional model for application of data from both said first and second sensors when the determination of availability indicates that data is available from both said first and second sensors;
generating a fourth decision model based on said confidence scores;
wherein the fourth decision model is selected as the additional model for application of data from said first sensor when the determination of availability indicates that data is only available from said first sensor;
generating a fifth decision model based on said confidence scores;
wherein the fifth decision model is selected as the additional model for application of data from said second sensor when the determination of availability indicates that data is only available from said second sensor; and an output device for outputting a result based on application of the available data.

8. A non-transitory computer-readable storage medium storing a program, which, when executed by a computer, causes the computer to perform a method for developing decision information relating to a single system based on data received from a plurality of sensors detecting the environment of that system comprising the steps of:

receiving first data from a first sensor that defines first information of a first type that is related to a system;

receiving second data from a second sensor that defines second information of a second type that is related to said system, wherein the first type is different from the second type;

refining the first information by using the second data as auxiliary data and refining the second information by using the first data as auxiliary data;

generating a first decision model for the first sensor based on the refined first information, the first decision model including first scores;

generating a second decision model for the second sensor based on the refined second information, the second decision model including second scores;

generating a third decision model based on the first and second scores;

determining whether data is available from only the first sensor, only the second sensor, or both the first and second sensors;

selecting based on the determination of availability an additional model to apply the available data, wherein the additional model is selected from a plurality of additional decision models including the third decision model;

converting the first scores of said first model to confidence scores by applying a probability, wherein generating the third decision model based on the first and second scores includes generating the third decision model based on the confidence scores;

wherein the third decision model is selected as the additional model for application of data from both said first and second sensors when the determination of availability indicates that data is available from both said first and second sensors;

generating a fourth decision model based on said confidence scores;

wherein the fourth decision model is selected as the additional model for application of data from said first sensor when the determination of availability indicates that data is only available from said first sensor;

generating a fifth decision model based on said confidence scores; and wherein the fifth decision model is selected as the additional model for application of data from said second sensor when the determination of availability indicates that data is only available from said second sensor.

* * * * *